United States Patent [19]
Wheeler et al.

[11] Patent Number: 4,842,466
[45] Date of Patent: Jun. 27, 1989

[54] LIGHTWEIGHT FASTENER

[75] Inventors: Roland A. Wheeler; Jack Rath, both of Los Angeles, Calif.

[73] Assignee: VSI Corporation, Culver City, Calif.

[21] Appl. No.: 846,940

[22] Filed: Apr. 1, 1986

[51] Int. Cl.$^4$ ............................................. F16B 35/00
[52] U.S. Cl. .................................. 411/366; 411/411; 411/436
[58] Field of Search ............... 411/436, 411, 366, 367, 411/368, 378, 427, 187, 399, 414, 416; 10/10 R, 152 R, 153, 27 R, 86 F, 86 R

[56] References Cited

U.S. PATENT DOCUMENTS

| | | | |
|---|---|---|---|
| 929,027 | 7/1909 | Schuhmann | 411/436 X |
| 1,940,617 | 12/1933 | Temple | 411/427 X |
| 2,215,930 | 9/1940 | Mahla | 411/411 X |
| 2,255,384 | 9/1941 | Hood | 411/436 X |
| 2,314,390 | 3/1943 | De Vellier | 10/10 R |
| 2,340,706 | 2/1944 | Somes | 411/411 X |
| 2,418,070 | 3/1947 | Green | 411/427 X |
| 2,740,136 | 4/1956 | Chiaberta et al. | 10/10 R |
| 2,793,884 | 5/1957 | Jungblut | 411/411 X |
| 2,895,367 | 7/1959 | Nagy | 411/378 |
| 3,205,756 | 9/1965 | Ollis, Jr. et al. | |
| 3,266,363 | 8/1966 | Bronson et al. | 411/436 |
| 3,664,540 | 5/1972 | Witkin | 411/436 X |
| 3,828,422 | 8/1974 | Schmitt | 411/366 |
| 4,157,725 | 6/1979 | Stanaitis | 411/147 |
| 4,735,537 | 4/1988 | Rath | 411/411 |

FOREIGN PATENT DOCUMENTS

| | | | |
|---|---|---|---|
| 204236 | 7/1959 | Austria | 411/411 |
| 843952 | 7/1952 | Fed. Rep. of Germany | 411/411 |
| 54-106754 | 8/1979 | Japan . | |
| 188372 | 8/1937 | Switzerland | 411/411 |
| 685703 | 1/1950 | United Kingdom . | |
| 857495 | 12/1960 | United Kingdom . | |
| 2074280 | 10/1981 | United Kingdom | 411/436 |
| 2088508 | 6/1982 | United Kingdom | 411/366 |
| 2114475 | 8/1983 | United Kingdom . | |

OTHER PUBLICATIONS

Military Specification MIL-B-7838B, Apr. 20, 1962, pp. 1 to 4.
Military Specification MILS-8879A, Dec. 8, 1965, pp. 1 to 10.

*Primary Examiner*—Neill Wilson
*Attorney, Agent, or Firm*—Christie, Parker & Hale

[57] ABSTRACT

An aerospace fastener comprises a bolt with a roll formed thread, and a nut with a similar thread having a uniform pitch P. The bolt has a cylindrical shank, a threaded tip and a run-out zone between the shank and tip. In the run-out, which is no longer than 2P, and in preferred embodiments is in the range of from 1.6P to 1.9P, the root of the roll formed bolt thread increases diameter continuously from the minor diameter of the tip thread to the diameter of the shank. The nut has a conical run-in truncating the crest of the nut thread parallel to the run-out to clear the root of the bolt thread when the nut is assembled on the bolt in the minimum grip condition. This permits the nut to be assembled on the bolt further than in a conventional combination, and shortening of the nut and bolt to save weight. Preferably the crest of the bolt thread is at the major diameter of the tip thread at distances beyond 0.75P from the maximum grip plane of the bolt.

29 Claims, 2 Drawing Sheets

Fig. 2

LIGHTWEIGHT FASTENER

BACKGROUND

This invention concerns lightweight fasteners such as for aerospace applications. A bolt with roll formed threads and shorter than usual effective thread run-out is provided. A shortened nut with thread run-out clearance is also provided.

Weight of fasteners is of great concern in airplanes and other aerospace applications. The nuts, bolts, rivets and the like employed for securing the structural elements of an airplane contribute a substantial portion to the total weight of the airplane since a very large number of fasteners are used. Thus, there has been a long effort to reduce the weight of fasteners without decreasing strength or preferably decreasing weight while increasing strength. Even an apparently small decrease in weight on an individual fastener can have a large impact on the total weight of an airplane.

Nuts and bolts are ubiquitous fasteners on aircraft. The vast majority of aircraft bolts have roll formed threads because of the superior fatigue properties of these threads as compared with machined threads. To make such bolts, a machined blank is rolled between a pair of thread forming dies for placing a thread on the blank. Metal is not removed from the blank in this process but instead the metal is deformed as the thread forming die presses in to form the root of the thread. The displaced metal flows outwardly to form the crest of the thread. A conventional thread rolling die has uniform thread forming ridges and grooves over most of its width for making a uniform thread. The edges of the die are, however, chamfered or rounded somewhat to avoid damage to the die. This chamfer results in a short run-out zone between the cylindrical shank of the bolt and the end on which threads are fully formed.

In conventional threaded aircraft fasteners the run-out zone has a length of up to two times the pitch of the thread. Within the run-out zone the root of the thread is not fully developed because of the chamfer on the roll forming die. That is, the thread is shallower than in the portion of the bolt where the thread is fully developed. Concomitantly, the crest of the thread in the run-out is not fully developed since less metal is displaced from the root. Thus, in the run-out the outside diameter of the crest of the thread is less than the major diameter in the fully threaded portion. The flanks of the bolt thread, which carry the tensile load on the nut and bolt combination, may also not be fully developed in the run-out. Thus, in the run-out the thread is referred to as imperfect and nonfunctional. The maximum length of the run-out under the specifications used in the aerospace industry is 2P, where P is the pitch of the thread. The actual length of the run-out due to normal manufacturing variations is in the range of from 1.5P to 2P.

Nuts used with conventional aerospace fasteners typically have a counterbored collar concentric with the threaded hole through the nut. The length of the counterbore is such that when fully tightened the threaded portion of the nut does not extend into the run-out on the bolt. If it were to extend into the run-out there would be thread interference and the nut could not be properly tightened on the parts being secured.

The length of the cylindrical shank of a bolt from its head to the beginning of the thread run-out is referred to as the maximum grip. High strength aerospace fasteners are designed so that the maximum grip corresponds to the maximum thickness of the parts being secured together. The minimum grip is typically one-sixteenth inch less than the maximum grip. For example, an aircraft fastener may have a nominal length of one-quarter inch for the maximum grip. That fastener would be used for securing together parts having a total thickness in the range of from three-sixteenths inch to one-quarter inch. If the fastener has a flush head, the grip is from the top of the head to the end of the shank. With a raised head not countersunk into one of the parts being secured, the grip is the cylindrical length of the shank.

The depth of the nut counterbore in a conventional aerospace fastener is the difference between the maximum grip and minimum grip plus about 1.5P. A small amount may be added to account for accumulated manufacturing tolerances. This means that when the nut is secured against the parts having the minimum grip, the end of the threads in the nut are at the end of the run-out, a distance of about 1.5P from the end of the cylindrical shank of the bolt. When the nut is secured against parts having the maximum grip, the threads on the nut stop about one-sixteenth inch plus 1.5P from the end of the run-out. The same concept is present in metric bolts and the difference between minimum grip and maximum grip is typically one millimeter.

It has been recognized that if the thread run-out were reduced to 1P or less instead of about 2P, the length of the collar on the nut could be reduced, thereby reducing the total length of the nut. This also permits a shortening of the bolt by 1P. The weight savings in an airplane by reducing the length of both the collar of the nut and bolt by as little as 0.75P can be quite substantial.

Aerospace fasteners have been developed with an effective run-out of only about 1P. In one such design, for example, a special roll forming die is used. Instead of tapering the root of the thread and producing an imperfect thread, a full thread is carried to within 1P of the cylindrical shank. This has permitted reduction of the total length of the nut and bolt by 1P without significantly reducing the tensile strength of the nut and bolt combination.

This type of short run-out bolt has drastically reduced fatigue properties as compared with a conventional bolt having a thread run-out with a length of up to 2P. An exemplary tensile fatigue test simulates an application where the parts secured together do not have parallel faces. For example, two parts may be secured together with the face engaged by the nut being out of perpendicular with the axis of the bolt shank by three degrees.

In a three-degree tensile fatigue test there is comparable off axis loading which induces some bending in the bolt. In an exemplary fatigue test an assembly of a nut and bolt is cycled between an upper tensile load of 50% of the rated capacity of the combination and a minimum load of 5% of the rated load bearing capacity of the combination. The number of cycles to failure is measured.

In such a test the bolt with a modified thread having only an effective 1P run-out has only about 20% of the fatigue life of a conventional bolt with up to 2P run-out. For example, if a conventional bolt has a fatigue life of 100,000 cycles, the modified lightweight bolt may have a fatigue life as low as 20,000 cycles in the three-degree off axis fatigue test. The adverse impact on tensile fatigue is apparently due to the rather deep thread close to the maximum grip plane at the end of the cylindrical shank. Such a short run-out bolt is also substantially poorer in a lap shear test than a bolt with a run-out of 2P.

Thus, it is desirable to provide an aerospace fastener with roll formed threads where the length of the nut and bolt can be reduced without reducing either the tensile capability of the combination or the two degree tensile fatigue strength of the combination. It is desirable to make such a fastener using roll forming dies relatively unchanged from conventional roll forming dies. It is particularly desirable to provide such a combination of nut and bolt that has increased strength as compared with conventional aerospace fasteners.

BRIEF SUMMARY OF THE INVENTION

Thus, there is provided in practice of this invention according to a presently preferred embodiment, a threaded bolt having a cylindrical shank and a tip with a roll formed thread. Between the shank and the fully developed thread on the tip there is a run-out zone having a maximum length of 2P where P is the pitch of the thread. In the run-out the root of the thread tapers continuously from the minimum root diameter at a distance of from about 1.1P to 2P from the shank to approximately the diameter of the shank at its end. The crest of the thread remains at its major diameter at all distances greater than 1P from the end of the shank, and preferably greater than 0.75P.

A nut has a hole with a thread and a counterbore at one end. A conical run-in -truncating the crest of the thread extends into the thread from the counterbore with a larger diameter at the end of the counterbore and a smaller diameter at a distance of up to about 2P from the maximum grip plane of a bolt with which the nut is used, the smaller diameter being approximately the same as the minor diameter of the thread root of such a bolt. The conical run-in is approximately parallel to the run-out of the root of the bolt thread. The run-in extends less than 1P into the thread.

When such a nut and bolt are assembled, the conical run-in the nut provides clearance between the truncated crest of the nut thread and the incomplete root of the bolt thread. Even when assembled on minimum grip parts, the truncated nut thread engages a portion of the bolt thread at a distance more than 1P from the end of the shank.

DRAWINGS

These and other features and advantages of the present invention will be appreciated as the same becomes better understood by reference to the following detailed description when considered in connection with the accompanying drawings wherein.

DESCRIPTION

Figure 1:
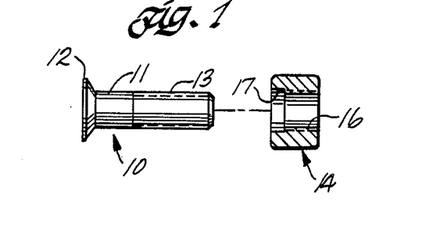
FIG. 1 illustrates in side view an exemplary nut and bolt of a type employed in practice of this invention.

An exemplary aerospace bolt 10 has a cylindrical shank 11, a head 12, and a threaded tip 13. In the jargon of the fastener art, the bolt may be referred to as a pin, the shank may be referred to as the grip, and the tip may simply be referred to as the thread. In the illustration of FIG. 1 a flush head bolt is shown. It will be understood, however, that a broad variety of bolt heads are employed in the fastener industry and the specific head is of no concern in practice of this invention. It will also be recognized that the bolt need not be torqued from the head but may have means at the end of the tip or dog for receiving or resisting torque. For example, a breakaway portion may be attached to the tip when a blind fastener is employed. Such features of the bolt are not material since this invention concerns the thread.

An exemplary nut 14 has a threaded hole 16 and a counterbore 17 at one end of the thread to form a collar 15 which fits over the bolt shank when parts have less than maximum grip. The external form of the nut is not material to practice of this invention.

Figure 2:
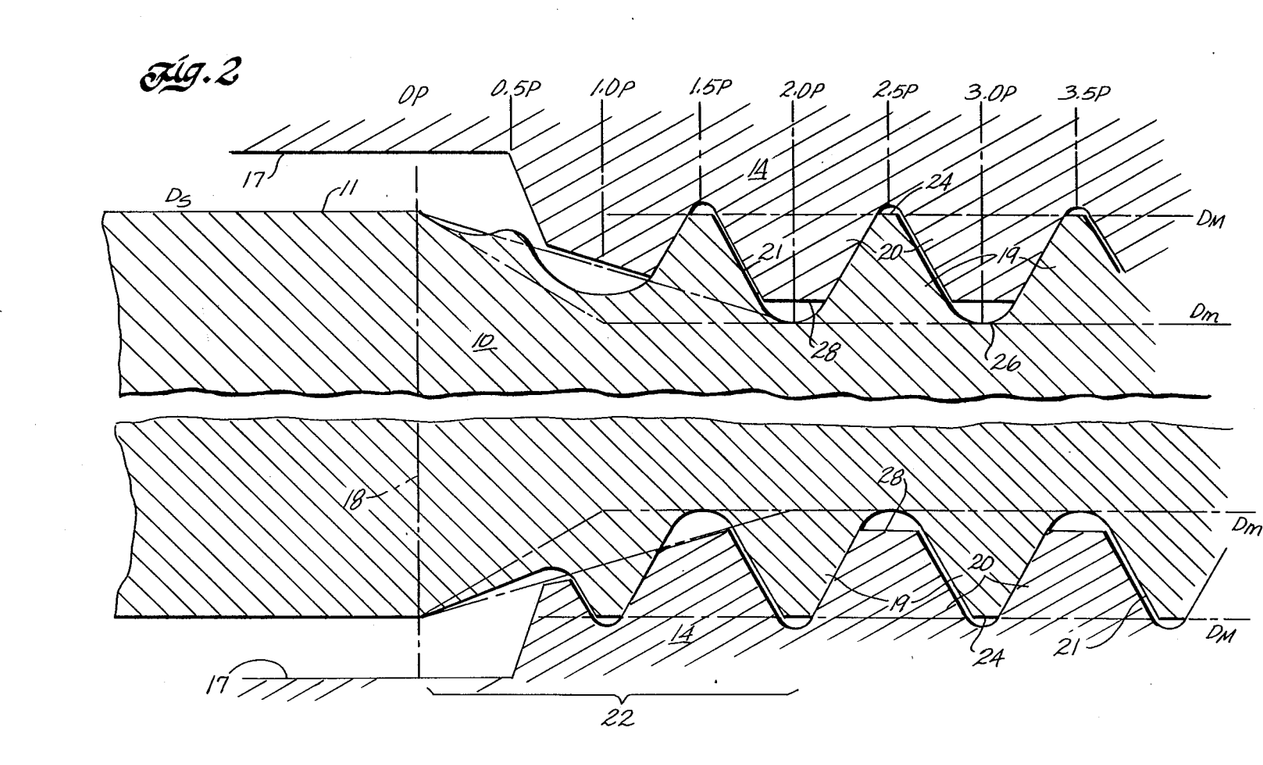
FIG. 2 illustrates in fragmentary cross section the run-out zone of a threaded bolt and the run-in zone of a nut as provided in practice of this invention.

As illustrated in FIG. 2 a typical fastener made under thread specification MIL-S-8879 has a 60° thread form; that is, the flanks of the thread are at an included angle of 60°. The pitch P of the thread is the distance from the flank of the thread at the pitch diameter to the corresponding location at the next turn of the thread. In other words, the pitch is 1/n where n is the number of threads per inch. The principles of this invention are applicable to other thread forms.

The end of the cylindrical shank 11 is at a plane 18 corresponding to the maximum grip of the bolt. This plane is commonly referred to as the maximum grip. At a distance greater than 2P from the end of the shank or maximum grip plane 18, the bolt thread 19 is fully developed by roll forming to conform to the applicable standard, such as MIL-S-8879.

The thread 20 on the nut engages the bolt thread 19 in a conventional manner. In the maximum material condition for both nut and bolt there may be a very tight fit on both flanks of the threads. The maximum material condition is the condition when the bolt has its largest volume and hence is at the maximum dimensions permitted for the particular bolt specification. Concomitantly, the nut has its maximum volume and the size of the threaded hole is at a minimum. This is the tightest fit of the nut and bolt. As illustrated in FIG. 2, the flanks of the threads on the side of the bolt thread nearer the shank are in tight engagement and a small clearance 21 may be present between the flanks of the nut and bolt threads on the unloaded side away from the bolt shank. This would be a typical condition when the nut is tightened on the bolt.

A bolt thread run-out zone 22 extends a distance up to 2P from the maximum grip plane 18. In an exemplary manufacturing operation the run-out may be shorter; as short as about 1.5P. If the fatigue properties of the bolt are of diminished significance, the run-out 22 of the thread root can be as short as about 1.1P. It is preferred that the run-out be in the range of from about 1.6P to 1.9P, and most preferably about 1.75P.

Figure 4:
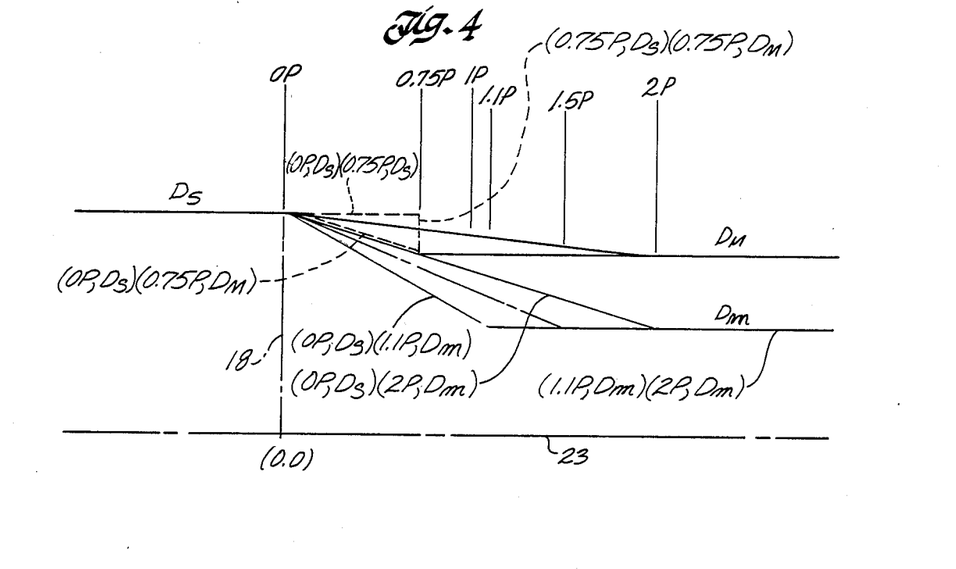
FIG. 4 illustrates a coordinate system for description of such a fastener.

It is convenient to define a coordinate system for reference to the geometry of the run-out. Such a coordinate system is illustrated in FIG. 4. The origin (0,0) of the system is established at the intersection of the maximum grip plane 18 and the axis 23 of the bolt. Distance along the axis is in units of P. Diameters of parts of the bolt are indicated by radial distances D from the center line of the bolt.

The diameter of the bolt shank is $D_s$. The major diameter $D_M$ is the diameter of the crest 24 of the bolt thread. The minor diameter $D_m$ is the diameter at the root 26 of the bolt thread. The major diameter $D_M$ is often less than the shank diameter $D_S$, however, in some embodiments the diameter at the crest of the threads may be as large as the shank diameter, i.e. $D_M=D_S$. The general case where $D_M<D_S$ is illustrated in FIG. 4.

Figure 3:
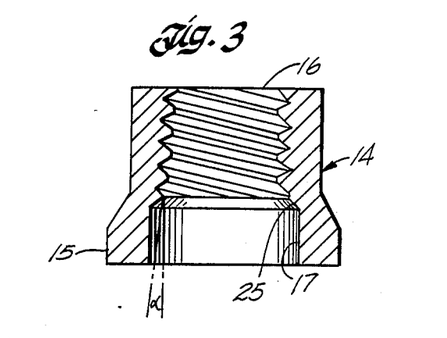
FIG. 3 illustrates such a nut in longitudinal cross section.

The nut, as seen in FIGS. 2 and 3, has a thread 16 with uniform pitch P to mate with the thread on the bolt. In the usual embodiment there is a cylindrical counterbore 17 for clearing the shank of the bolt. At the end of the counterbore there is a conical countersink 25 that is the consequence of practical machining operations. The nut is threaded for the full length between the countersink 25 and the opposite end of the hole.

Extending from the countersink into the thread is a conical "run-in" truncating the crest of the thread along a cone having a larger diameter at the end of the countersink. The smaller diameter of the conical run-in is at a distance up to 2P from the maximum grip plane of a bolt with which the nut is used. The smaller diameter is approximately the same as the diameter of the crest 28 of the nut thread. Preferably the smaller diameter is about the same as the diameter of the root of the thread on a bolt with which the nut is to be used. In a preferred embodiment the run-in extends up to about 1P into the thread beyond the surface of the countersink.

In a preferred embodiment, the angle alpha of the run-in relative to the axis of the nut is the angle, the tangent of which is the maximum depth from the crest to the root of the bolt thread, over 2P. The maximum depth from the crest of the bolt thread to the root of the bolt thread is a defined parameter of specifications for threaded fasteners. Thus, for example, for a thread made under thread specification MIL-S-8879, the maximum depth from the crest to the root of the thread is $\frac{5}{8}$ of the thread height H.

Thus, for a thread made under specification MIL-S-8879 or the like, $$alpha = arctan[(\tfrac{5}{8}H)/2P]$$

where H is the thread height and is equal to 0.866025P. For such a 60° thread, the half angle alpha illustrated in FIG. 3 would be a little more than 16 degrees. Preferably the half angle of the run-in cone is in the range of from about 14° to 18°. That is, the included angle of the conical run-in is between about 28° and 36°. Thus, the thread in the run-in zone is truncated at the locus of a cone extending into the thread a distance less than 1P and having an included angle of between 28 and 36 degrees.

The conical run-in extending into the nut thread from the countersink corresponds to the 2P long run-out 22 of the bolt thread. The truncated thread in the run-in zone of the nut is approximately parallel to the run-out of the root of the thread on the bolt with which the nut is to be used. The angle of the run-in in the nut is selected on the basis of the run-out of the bolt when the run-out is at its maximum acceptable length. When the run-out of a specific bolt is less than the usual 2P, the run-in is not exactly parallel to the run-out on such a bolt.

When the nut is assembled on the bolt, the conical run-in on the nut provides clearance for the root of the thread in the run-out on the bolt. Clearance is not required for the cast of the thread on the bolt since, even in a conventional bolt, the crest of the thread is never larger than the major diameter of the complete thread. The run-in extends into the nut thread a sufficient distance to clear the run-out of the root of the thread on the bolt when the combination is assembled against parts in the minimum grip condition. In that condition the end of the thread in the nut is no more than 1P from the maximum grip plane of the bolt.

In an embodiment hereinafter described, the bolt run-out has a length of about 1.75P, and in such an embodiment the run-out angle of the thread root is about 18.3°. The run-in in such an embodiment truncates the nut thread in a cone having a half angle of up to about 20°.

A bolt as provided in practice of this invention has at least a portion of the crest of the thread in the run-out which is fully developed. In conventional roll forming of threads, there is an insufficient volume of metal in the blank to fill the thread groove in the die with displaced metal, resulting in an incomplete thread in the run-out. Since it has been anticipated that the thread may be incomplete, any contribution an incidentally complete thread might provide toward enhancing the strength of the nut and bolt combination has previously been deliberately sacrificed by extending the counterbore into the nut so as to always be beyond the run-out. Further, the maker of the roll forming die has devoted little attention to the precision of the chamfer at the edge of the die since it has little effect on the final product.

It is desirable, however, in practice of this invention to provide a complete thread to the extent feasible in practical forming operations. For example, it is desirable to provide a complete thread in the run-out at distances greater than about 0.75P from the maximum grip plane of the bolt. To do so, care is exercised in forming a chamfer on the edge of the roll forming die over the distance from about 0.75P to 2P so that its geometry is known. The volume of metal displaced from the root of the thread is thus known. The blank from which the bolt is formed is machined to have a sufficient volume of metal in the length from about 0.75P to 2P to fill the thread groove in the die.

Previously it has been the practice to simply grind a conical transition between the cylindrical shank and approximately the pitch diameter of the tip. To make a bolt with a complete thread crest from about 0.75P to 2P, the transition between the shank and tip is ground to have a more compex shape and a somewhat larger volume of metal than previous blanks. The exact shape of the transition depends on the shape chosen for the run-out chamfer on the roll forming die and the specific thread being rolled.

Alternatively, a simple shape such as a cone can be ground on the blank, with the edge of the roll forming die ground to have a complex shape that assures that the thread crest is complete in the desired portion of the run-out. Preferably, the edge of the die is formed with a known geometry, simple or complex and the transition zone on the blank is ground to a shape that assures that the thread grooves on the die are filled in the run-out from 0.75P to 2P.

The additional volume of metal and volume distribution on the blank can be readily calculated for a selected die geometry using modern iterative programs. Alternatively, the die can be edge ground to have a desired known chamfer and then the shape of the blank needed to fill the thread grooves and form complete thread crests can be found empirically. The blanks can be formed with conventional numerically controlled machines, or more commonly, the wheel used to grind the taper on the blank is dressed with a cam controlled wheel dresser to have the proper perimeter for grinding the desired shape.

When such a blank is roll formed with controlled geometry dies, the crest of the thread from about 0.75P to 2P is complete, and a portion of the flank of the thread is capable of carrying tensile load applied between the nut and bolt. The flanks of the run-out thread are helical continuations of the flanks of the thread on the tip in that portion of the run-out beyond 0.75P and outside of a line between the shank diameter at the maximum grip plane and the minor diameter of the thread at 2P from the maximum grip plane.

The thread from 0.75P to the maximum grip may still be incomplete since it can contribute little to the load carrying capacity of the combination, and it becomes increasingly difficult to control as the total volume of metal being displaced decreases. This is a consequence of the tolerances inherent in manufacturing operations.

Fasteners are designed with the maximum material condition in mind. A size tolerance is permitted in specifications and the nut and bolt may both be at less than the maximum material condition, resulting in a looser fit. The controlled geometry of the roll forming dies and the blank from which a bolt is formed is determined for the maximum material condition of the bolt. Thus, when the blank is at less than the maximum material condition, the volume of metal in the larger diameter end of the transition zone on the blank may differ from what is determined to be sufficient to fill the thread grooves. Thus, the part of the thread from the maximum grip plane to about 0.75P would rarely be complete since the total volume of metal displaced is small and the discrepancy due to the blank being in less than the maximum material condition has a significant effect on the final thread form. It is therefore impractical to attempt to provide a fully developed thread crest in the run-out from the maximum grip plane to about 0.75P.

The difficulty of achieving a full thread crest in the run-out clearly increases as the volume of metal displaced decreases. It is therefore acceptable in practice of this invention to provide a substantially fully developed thread crest in the run-out from 1P to 2P, and permit an incomplete thread in the length from the maximum grip to 1P.

In summary, in the run-out on the bolt the root of the thread decreases continuous from the shank diameter at the maximum grip plane to a minor diameter of the thread root at a distance from about 1.1P to about 2P. In some embodiments the root of the thread may continue at about the minor diameter to about 1.1P and then increase continuously from there to the shank diameter at the maximum grip. Preferably, the root of the thread is at the minor diameter to a point between 1.5P and 2P and increases continuously from that point to the shank diameter. The crest of the thread is substantially at its major diameter at all locations greater than about 1P and preferably greater than 0.75P. From maximum grip to about 1P or preferably 0.75P, the crest of the thread may be incomplete.

The invention can also be expressed in terms of the coordinate system represented in FIG. 4. The run-out has a maximum length of 2P. The root of the thread is in a triangular envelope defined by the lines $(OP, D_s)$, $(1.1P, D_m)$; $(1.1P, D_m), (2P, D_m)$; and $(OP, D_s), (2P, D_m)$. Preferably the root of the thread is within an envelope defined by the lines $(OP, D_s), (1.5P, D_m)$; $(1.5P, D_m), (2P, D_m)$; and $(OP, D_s), (2P, D_m)$. Within either envelope, the root diameter increases continuously from the minor diameter to the shank diameter. The crest of the thread is preferably within a triangular envelope defined by the lines $(OP, D_s)$, $(0.75P, D_s)$; $(OP, D_s), (0.75P, DM)$; and $(0.75P, D_s)$, $(0.75P, DM)$, and along a line $D_M$ when P is greater than 0.75. If desired the crest of the thread can be within a triangular envelope defined by the lines $(OP, D_s), (1P, D_s)$; $(OP, D_s), (1P, D_M)$; and $(1P, D_s), (1P, D_M)$, and along a line $D_M$ when P is greater than 1.

A nut with conical run-in as provided in practice of this invention provides engagement of the truncated nut thread with the thread on the bolt in the run-out when the assembly is tightened on minimum grip parts, thereby adding to the tensile strength of the assembly. The truncated thread, clearly, maintains partial engagement with the thread on the tip of the bolt when tightened on thicker than minimum grip parts. The truncation of the nut thread prevents interference with the root of the bolt thread in the run-out.

Surprisingly, the truncation of the first turn or so of the thread in the nut does not decrease the tensile strength of the combination when the assembly is on parts larger than the minimum grip. This is believed due to non-uniform loading of threads in a nut of uniform pitch. It is known, for example, that the first turn of a thread in a five turn nut may carry as much as 40% of the load, with the balance being distributed in a gradually decreasing amount with increasing distance from the end of the nut.

It is a common practice to make nuts with a weaker material than bolts so that ultimate failure in tension occurs by shearing off the nut thread. A truncated thread adjacent to the end of the nut may result in deformation of the first part of the thread and distribution of the load more uniformly with distance from the end of the nut. This could lower the maximum stress on the thread and delay the onset of shear failure. Regardless of the reason, it has been observed that a nut as provided in practice of this invention not only does not show any decrease in tensile load carrying capacity, but may actually show a small increase in strength in some embodiments.

A nut with a conical run-in truncating the crest of the thread at the end engages the complete thread crest in the run-out of a bolt constructed according to principles of this invention when the nut is tightened against parts in the minimum grip condition. Shear is applied to the nut threads at the major diameter, just as it is when the nut is engaging complete threads further from the minimum grip condition. That is, the stress distribution on the nut is the same whether the nut is entirely on the tip or whether the thread in the run-in is engaging the largely complete thread in the run-out on the bolt.

It has been found in practice of this invention in a specific example, that a length reduction of about 1P can be provided in both the nut and bolt, with consequent weight reduction. A nominal 3/16 inch fastener is a 10-32 UNJF fastener which has a pitch of 0.03125 inch. A tapered conical run-in is provided in such a nut with an included cone angle of 32.2°, i.e. a half angle alpha of 16.1°, for a distance of about 1.7P from the maximum grip. A 0.1985 inch diameter counterbore extends about 0.014 inch beyond the maximum grip; that is, the counterbore has a depth of about 0.076 inch. The counterbore ends in a conventional 60° countersink. In such an embodiment, the diameter of the truncation of the thread where the run-in intersects the surface of the countersink is about 0.00925 inch greater than the minor diameter of the nut thread. The run-in cone extends into the thread less than 1P.

It is found in this embodiment of a 10-32 fastener that a maximum material condition nut can be tightened into a maximum material condition bolt a little more than 0.032 inch further than a standard nut, without interference with the root of the bolt thread, regardless of whether the bolt is a standard bolt or an improved bolt as provided in practice of this invention. It is preferred to use the nut with a conical truncation of the thread with a bolt having a complete thread crest in the portion of the run-out from about 1P to 2P so that the shear load is applied at the major diameter of the bolt throughout the length of the nut thread. Thus, the nut and bolt can each be shortened 0.032 inch without decreasing strength.

In some embodiments, it may be desirable to end the thread run-out at a diameter smaller than the shank diameter and at a location beyond the maximum grip plane. In such an embodiment, the angle of the thread root run-out may be decreased in the event the total run-out is limited to 2P from the maximum grip plane. A concomitant change may be made in the angle of the nut run-in so that it is approximately parallel to the root run-out.

It is particularly preferred that the run-out of the root of the bolt thread extends from the maximum grip plane to about 1.6P to 1.9P, and most specifically to about 1.75P. This run-out maintains ample fatigue strength and enables shortening of the fastener length for significant weight savings. Shorter run-out, when shortened still more due to manufacturing tolerances, may compromise resistance to fatigue failure in the 3° off axis tensile fatigue test.

In such an embodiment, the angle of the run-out of the bolt thread is larger than in an embodiment where the run-out is 2P. If the run-out is 1.75P, the run-out angle is about 18.3°. It is particularly preferred that the nut have a run-in with an angle corresponding to the run-out angle of the thread root of the bolt with which the nut is designed for use. The angle of a nut specifically for use with this bolt has a run-in angle of about 16° to 20°. It can remain desirable, however, to provide a run-in corresponding to a run-out of 2P so that the nut can also be used with conventional bolts.

In some embodiments, bolts are made "oversize". Such bolts are made with a larger than standard shank to substitute for a standard bolt when a hole in parts to be joined is slightly oversize due to repair work. It may occur, for example, that a hole is damaged so that a standard bolt no longer fits properly. Such a hole is then reamed 1/64 inch and a larger bolt is used. Thus, it is standard practice to provide first oversize and second oversize bolts which are 1/64 and 1/32 inch larger than a standard size bolt.

The oversize bolts typically have an oversize shank, with the original thread size on the tip. This requires a somewhat longer run-out than a standard bolt. The tolerance range for standard bolts permits a run-out of from 1.2P to 2P. The range for a first oversize bolt is from 1.5P to 2.5P. The range for a second oversize bolt is from 1.75P to 3P. Nuts made for use with such oversize bolts have a concomitantly larger and deeper counterbore and are longer to maintain sufficient thread engagement. Principles of this invention are applicable to such oversize fasteners with equivalent variations of the thread form in the run-out.

A bolt provided in practice of this invention has roll formed threads, as distinguished from bolts with machined threads. A nut employed in practice of this invention may be used with a roll formed bolt or a machined bolt. The thread in such a nut may be tapped, or may be made by roll tapping.

Since variations of this sort are within the skill of this art, it will be understood that within the scope of the appended claims, this invention may be practiced otherwise than as specifically described.

What is claimed is:

1. A threaded bolt which can be engaged by a nut comprising:
   a cylindrical shank having a radius $D_s$;
   a tip having a roll formed thread with a uniform pitch P, a major radius $D_M$ smaller than $D_s$, and a minor radius $D_m$;
   a maximum grip plane defined between the shank and tip; and
   a run-out zone between the shank and tip having a maximum length of 2P, the run-out zone having a roll formed thread wherein the root of the thread is in a triangular envelope in a Cartesian coordinate system with the length of the fastener being the abscissa, radium being the ordinate and the centerling of the fastener at the maximum grip plane being the origin, the abscissa units being the pitch P and the distances $D_s$ being the radius to the shank diameter, $D_M$ being the radium to the major diameter, and $D_m$ being the radius to the minor diameter, and defined by the lines (OP, $D_s$), (1.1P, $D_m$); (1.1P,$D_m$), (2P, $D_m$); and OP, $D_s$), (2P, $D_m$) and the crest of the thread is within a triangular envelope defined by the lines (OP, $D_s$), (0.75P, $D_s$); (OP, $D_s$), (0.75P, $D_M$); and (0.75P, $D_s$), (0.75P, $D_M$), and substantially along a line $D_M$ when the crest of the thread is further from the maximum grip plane than 0.75P, and the flanks of the thread in the run-out zone outside the envelope of the thread root and where the thread crest extends along the line $D_M$ are substantially a helical continuation of the flanks of hhe thread on the tip.

2. A fastener as recited in claim 1 wherein the crest of the thread is within a triangular envelope defined by the lines (OP,$D_s$),(1P,$D_s$); (OP,$D_s$),(1P,$D_M$); and (1P,$D_s$),(1P,$D_M$), and along a line $D_M$ when P is greater than 1.

3. A fastener as recited in claim 2 wherein the root of the thread is within a triangular envelope defined by the lines (OP,$D_s$),(1.5P,$D_m$); (1.5$D_m$),2P,$D_m$); and (OP,$D_s$),(2P,$D_m$).

4. A fastener as recited in claim 1 wherein the root of the thread is within a triangular envelope defined by the lines (OP,$D_s$),(1.5P,$D_m$); (1.5$D_m$),(2P,$D_m$); and (OP,$D_s$),(2P,$D_m$).

5. A threaded bolt which can be engaged by a nut comprising:
   a cylindrical shank;
   a tip having a roll formed thread with a uniform pitch P, a major diameter smaller than the diameter of the shank and a minor diameter;
   a maximum grip plane defined between the shank and tip; and
   a run-out zone between the shank and tip, the run-out zone having a roll formed thread, the root of the thread in the run-out zone continuously increasing in diameter from the minor diameter at a location in the range of from 1.6 to 1.9P from the maximum grip plane toward the shank diameter adjacent to the maximum grip plane, the crest of the thread being at substantially the major diameter beyond about 1P from the end of the shank, and the flanks of the thread beyond about 1P from the end of the shank and at a radial distance from the axis of the fastener greater than the root of the thread being substantially a helical continuation of the flanks of the thread on the tip.

6. A fastener as recited in claim 5 wherein the crest of the thread is at substantially the major diameter beyond about 0.75P from the end o the shank.

7. A threaded fastener comprising:
a body;
a threaded hole in the body;
a thread having a uniform pitch P in the hole;
a counterbore at one end of the hole having an inside diameter larger than the diameter of the thread root and a length less than 1/16 inch plus 0.5P; and
a conical run-in extending into the thread from the counterbore and truncating the crest of the thread, the run-in having a larger diameter at the end of the counterbore less than the diameter of the root of the thread, and a smaller diameter at a distance of less than 1.5P from the end of the counterbore approximately the same as the minor diameter of the thread of a bolt with which the fastener is used.

8. A fastener as recited in claim 7 comprising a conical countersink at the end of the counterbore and wherein the run-in extends into the thread in the hole a distance less than 1P from the surface of the countersink.

9. A fastener as recited in claim 7 wherein the included angle of the conical run-in is in the range of from 28° to 36°.

10. A fastener as recited in claim 7 wherein the half angle of the conical run-in is an angle with a tangent about the same as the maximum depth from the crest to the root of the thread of a bolt with which the nut is designed for use, over 2P.

11. A fastener as recited in claim 7 wherein the half angle of the conical run-in is an angle with a tangent about the same as the maximum depth from the crest to the root of the thread of a bolt with which the nut is designed for use, over a distance in the range of from 1.6P to 1.9P.

12. A threaded fastener comprising:
a body;
a hole through the body having a thread with a uniform pitch P;
a cylindrical counterbore in one end of the fastener having a depth less than about 1/16 inch plus 0.5P; and
a conical run-in truncating the crest of the thread at the end adjacent to the counterbore with a half angle having a tangent about the same as the maximum depth from the crest to the root of the thread of a bolt with which the nut is designed to be used, over 2P, the run-in cone extending a distance from the end of the thread less than 1.5P.

13. A fastener as recited in claim 12 wherein the run-in cone extends into the thread a distance less than about 1P from the end of the thread.

14. A threaded fastener comprising:
a body;
a hole through the body having a thread with a uniform pitch P;
a cylindrical counterbore in one end of the fastener having a depth less than about 1/16 inch plus 0.5P; and
a conical run-in truncating the crest of the thread at the end adjacent to the counterbore with a half angle having a tangent about the same as the maximum depth from the crest to the root of the thread of a bolt with which the nut is designed to be used, over a distance in the range of from 1.6P to 1.9P, the run-in cone extending a distance from the end of the thread less than 1.5P.

15. A fastener as recited in claim 14 wherein the run-in cone extends into the thread a distance less than about 1P from the end of the thread.

16. A threaded fastener comprising:
a body;
a hole through the body having a thread with a uniform pitch P;
a cylindrical counterbore in one end of the fastener having a depth less than about 1/16 inch plus 0.5P; and
a conical run-in truncating the crest of the thread at the end adjacent to the counterbore with an included angle in the range of from about 28° to 36° and extending a distance from the end of the thread less than 1P.

17. A threaded fastener comprising:
a bolt having a head, a cylindrical shank adjacent to the head, a tip having a roll formed thread with a uniform pitch P, a maximum grid plane defined between the shank and tip, and a run-out zone between the shank and tip having a maximum length of 2P, the run-out zone having a roll formed thread wherein the root of the thread has a diameter no greater than the diameter along a line between the diameter of the shank at the maximum grip plane and the root of the thread on the tip at a distance of 2P from the maximum grip plane, and no less than the diameter along a line between the diameter of the shank at the maximum grip plane and the root of the thread on the tip at a distance of 1.1P from the maximum grip plane; and
a nut having a hole with a thread of uniform pitch P, a counterbore in the end of the nut nearer the head of the bolt, and a run-in truncating the crest of the thread a distance less than 1.5P from the end of the counterbore, so that when the nut and bolt are assembled with the run-in and run-out overlapping, at least a portion of the truncated nut thread engages bolt thread in the run-out zone.

18. A fastener as recited in claim 17 comprising a conical countersink at the end of the counterbore, and wherein the run-in extends into the thread a distance less than 1P from the surface of the countersink.

19. A fastener as recited in claim 17 wherein the root of the thread on the bolt has a diameter no greater than the diameter along a line between the maximum grip end of the shank and the root of the thread on the tip at a distance of about 1.75P from the maximum grip end of the shank.

20. A fastener as recited in claim 19 wherein the run-in cone in the nut is approximately parallel to the run-out of the root of the thread on the bolt.

21. A fastener as recited in claim 17 wherein the crest of the bolt thread in the run-out at distances greater than 1P from the maximum grip end of the shank is at the major diameter of the thread on the tip.

22. A threaded fastener comprising:

a bolt having a head, a cylindrical shank adjacent to the head, a tip having a roll formed thread with a uniform pitch P, a maximum grip plane defined between the shank and tip, and a run-out zone between the shank and tip having a maximum length of 2P, the run-out zone having a roll formed thread wherein the root of the thread has a diameter no greater than the diameter along a line between the diameter of the shank at the maximum grip plane and the root of the thread on the tip at a distance of 2P from the maximum grip plane and no less than the diameter along a line between the diameter of the shank at the maximum grip plane and the root of the thread on the tip at a distance of 1.1P from the maximum grip plane; and a nut having a hole with a thread of uniform pitch P, a counterbore in the end of the nut nearer the head of the bolt, having a depth of less than 1/16 inch plus 0.5P and a run-in truncating the crest of the thread a distance less than 1.5P from the end of the counterbore, the run-in being approximately parallel to the run-out of the root of the thread on the bolt, so that when the nut and bolt are assembled with the run-in and run-out overlapping, at least a portion of the truncated nut thread engages bolt thread in the run-out zone.

23. A fastener as recited in claim 22 wherein the root of the thread on the bolt has a diameter no greater than the diameter along a line between the maximum grip end of the shank and the root of the thread on the tip at a distance of about 1.75P from the maximum grip end of the shank.

24. A fastener as recited in claim 22 wherein the crest of the bolt thread in the run-out at distances greater than 1P from the maximum grip end of the shank is at the major diameter of the thread on the tip.

25. A fastener as recited in claim 22 comprising a conical countersink at the end of the counterbore, and wherein the run-in extends into the thread a distance less than 1P from the surface of the countersink.

26. A threaded fastener comprising:

a bolt having a head, a cylindrical shank adjacent to the head having a specified length from the head to a maximum grip plane, a tip having a roll formed thread with a uniform pitch P and a major diameter smaller than the shank diameter, a maximum grip plane defined between the tip and shank, and a run-out zone between the shank and tip having a maximum length of 2P, the thread being complete beyond the run-out zone, the run-out zone having a roll formed thread wherein he root of the thread has a diameter no greater than the diameter along a line between the diameter of the shank at the maximum grip plane and the root of the thread on the tip at a distance of 2P from the maximum grip plane and no less than the diameter along a line between the diameter of the shank at the maximum grip plane and the root of the thread on the tip at a distance of 1.1P from the maximum grip plane; and a nut having a hole with a thread of uniform pitch P, a counterbore in the end of the nut nearer the head of the bolt, and a sufficient run-in truncating the crest of the thread at the end of the thread adjacent the counterbore to permit at least partial engagement of truncated thread in the nut and thread on the bolt, and to avoid interference of the thread in the nut with the root of the thread on the bolt in the portion of the run-out zone further than 1P from the maximum grip end of the shank when the nut is threaded onto the bolt with the end of the nut thread no more than 1P from the maximum grip end of the shank.

27. A fastener as recited in claim 26 wherein the crest of the bolt thread in the run-out at distances greater than 1P from the maximum grip end of the shank is at the major diameter of the thread on the tip.

28. A fastener as recited in claim 27 wherein the flanks of the bolt thread in that portion of the run-out further than 1P from the maximum grip end of the shank and outside of a line between the diameter of the shank at the maximum grip end of the shank and the root of the bolt thread at 2P from the maximum grip end of the shank are helical continuations of the flanks of the bolt thread further than 2P from the maximum grip end of the shank.

29. A fastener as recited in claim 26 wherein the nut comprises a counterbore concentric with the thread at one end of the nut and a countersink between the counterbore and the end of the thread, and wherein the conical run-in extends into the nut thread less than 1P from the surface of the countersink.

* * * * *

UNITED STATES PATENT AND TRADEMARK OFFICE
CERTIFICATE OF CORRECTION

PATENT NO. : 4,842,466

DATED : June 27, 1989

INVENTOR(S) : Roland A. Wheeler, Jack Rath

It is certified that error appears in the above-identified patent and that said Letters Patent is hereby corrected as shown below:

Column 3, Line 30, delete the hyphen before "truncating";
Column 3, Line 41, -- in -- should be inserted after "run-in";
Column 5, Line 63, "cast" should be -- crest --;
Column 7, Line 30, "par" should be -- part --;
Column 8, Line 4, "DM" should be -- $D_M$ --.

Column 10, Line 25, "radium" should be -- radius --;
Column 10, Lines 25, 26, "centerling" should be -- centerline --;
Column 10, Line 29, "radium" should be -- radius --;
Column 10, Line 32, before "OP" insert an opening parenthesis;
Column 10, Line 42, "hhe" should be -- the --;
Column 10, Line 50, before "2P" insert an opening parenthesis;
Column 11, Line 12, "o" should be -- of --.
Column 14, line 5, "he" should be -- the --.

Signed and Sealed this

Fifth Day of June, 1990

Attest:

HARRY F. MANBECK, JR.

*Attesting Officer*  *Commissioner of Patents and Trademarks*